United States Patent Office 3,803,147
Patented Apr. 9, 1974

3,803,147
MANUFACTURE OF BIPYRIDYLIUM SALTS AND RELATED COMPOUNDS
John Francis Cairns, Runcorn, England, assignor to Imperial Chemical Industries Limited, London, England
No Drawing. Continuation-in-part of application Ser. No. 809,402, Mar. 21, 1969, now Patent No. 3,706,752, dated Dec. 19, 1972. This application Oct. 26, 1972, Ser. No. 300,966
Claims priority, application Great Britain, Oct. 9, 1968, 47,793/68; Dec. 23, 1968, 61,011/68
Int. Cl. C07d 31/42
U.S. Cl. 260—250 R     13 Claims

ABSTRACT OF THE DISCLOSURE

This invention relates to the manufacture of bipyridylium salts and related compounds and particularly to a process for the manufacture of 1,1'-disubstituted bipyridylium salts which are useful herbicides.

---

This application is a continuation-in-part of patent application Ser. No. 809,402, filed Mar. 21, 1969, now U.S. Pat. No. 3,706,752, dated Dec. 19, 1972.

BACKGROUND OF THE INVENTION

According to the present invention I provide a process for the manufacture of 1,1'-disubstituted-4,4'- (or -2,2'-) bipyridylium salts which comprises treating the corresponding 1,1'-disubstituted-1,1'-dihydro-4,4'- (or -2,2'-) bipyridyl with oxygen or an oxidizing agent which has a redox potential in water more positive than −0.50 volt as compared with the saturated calomel electrode.

The reaction preferably is carried out in the presence of a solvent for the dihydrobipyridyl. Any inert organic or inorganic solvent can be employed, i.e. any solvent which does not react with the 1,1'-disubstituted dihydrobipyridyl or the oxidizing agent, since the sole function of the solvent is as a diluent for the reaction mixture. The solvent is not critical as is known in this art, for example from U.S. patent specification No. 3,405,135. Examples of suitable solvents are carbon disulphide; ethers and thioethers for example diethyl ether, tetrahydrofuran, 1:2-dimethoxyethane bis-(2-methoxyethyl) ether, 1:4-dioxane and thiophene; ketones, for example acetone; hydrocarbons, for example benzene, toluene, xylene and hexane; organic bases, for example pyridine; halogenated hydrocarbons and particularly chlorinated hydrocarbons, for example chlorobenzene, chloroform, and methylene dichloride; amides, particularly tertiary alkylamides, for example dimethyl formamide; sulphoxides, for example dimethyl sulphoxide; sulphones, for example sulpholane; and nitriles, for example acetonitrile. Mixtures of solvents may be used, if desired. We prefer to use a solvent or mixture of solvents which is immiscible with water since this assists recovery of the product by phase-separation.

The concentrations of the dihydrobipyridyl and the oxidizing agent in the solution are not critical and can vary within wide limits. By way of example the concentration of the dihydrobipyridyl may be conveniently from 0.05 to 0.15 mole per litre and the concentration of the oxidizing agent may be from 0.1 to 10 gms. per 100 mls. of the reaction mixture.

The temperature at which the reaction is carried out is not critical and the optimum temperature will depend upon the concentration of the reagents, the particular reagents and solvent used and the boiling point of the reaction mixture. We have found that suitable temperatures are from 0° C. to 150° C. especially from 20 to 100° C.; room temperature can be used. In general, increasing the temperature of the reaction increases the rate of reaction. The most suitable time of reaction can be found by simple experiment and depends upon the reagents used and the temperature at which the reaction is carried out; we have however found that a time of 20 to 30 minutes is usual in order to obtain optimum yields. The optimum temperature and time for any particular reaction mixture can be determined by simple experiment.

The N-substituent of the 1,1'-disubstituted dihydrobipyridyls can be any substituent which is inert under the reaction conditions (i.e. is inert to the solvent and oxidizing agent). The product 1,1'-disubstituted-bipyridylium salt contains the same N-substituents as the dihydrobipyridyl starting material. The N-substituents are not critical providing they are inert and can be an alkyl group, a benzyl group or a carbamidoalkyl group, as is well known in the art. Such substituents are described in U.S. patent specifications Nos. 3,405,135; 3,484,447; 3,478,042; 3,461,128 and 3,491,104 in which 1,1'-disubstituted-1,1', 4,4'-tetrahydro-4,4'-bipyridyls (from which the 1,1'-disubstituted-1,1'-dihydro-4,4'-bipyridyls can be prepared as described hereinafter) are described. Alkyl groups which may be present are lower alkyl groups containing from 1 to 6 carbon atoms, for example, methyl, ethyl, propyl, butyl and pentyl groups. The carbamidoalkyl groups have the formula —$R_1$—$CONR_2R_3$ wherein $R_1$ is a lower alkylene radical of 1 to 6 carbon atoms, especially the methylene radical —$CH_2$—, and $R_2$ and $R_3$ (which may be same or different) are lower alkyl groups of 1 to 6 carbon atoms or alternatively $NR_2R_3$ is a piperidino or a morpholino group. In respect of 1,1'-disubstituted-1,1'-dihydro-2,2'-bipyridyls, the N-substituent may be a lower alkyl or carbamido lower alkyl group as above and in addition the N-substituents taken together can be a lower alkylene radical of 2 to 6 carbon atoms, especially the ethylene radical —$CH_2CH_2$—.

The 1,1'-disubstituted-1,1'-dihydrobipyridyls for use in the process of the invention can be prepared by oxidation of the corresponding 1,1'-disubstituted tetrahydrobipyridyls. Tetrahydro-4,4'-bipyridyls are well known in the art and they are described, for example, in U.S. patent specifications Nos. 3,405,135; 3,484,447; 3,478,042 and 3,491,104 in which processes for their preparation also are described. The 1,1'-disubstituted-1,1'-dihydro-2,2'-bipyridyls are also well known in the art and a process for their preparation is described in Example 10 below.

The 1,1' - disubstituted - 1,1'-dihydrobipyridyls can be prepared by reacting the corresponding 1,1'-disubstituted tetrahydrobipyridyls with sulphur or an organic disulphide. The reactants can be interacted simply by mixing them at room temperature but we prefer to carry out the interaction in an inert, preferably water-immiscible solvent for the tetrahydrobipyridyl. Examples of solvents which may be used are carbon disulphide, ethers, ketones, hydrocarbons, halogenated hydrocarbons, organic bases such as pyridine, tertiary alkylamides, sulphoxides and nitriles. The temperature can vary over a wide range but preferably is from 0 to 150° C. The concentration of the 1,1'-disubstituted tetrahydrobipyridyl can be from 0.05 to 0.15 m.p.l. and the concentration of S or —S=S— from 0.1 to 10 g. per 100 ml. of the reaction mixture; a molar ratio of at least 2:1, especially at least 3:1 of S or —S=S— to tetrahydrobipyridyl is preferred. Examples of preparations using S are included in Examples 7, 8, 9 and 10 hereinafter.

The 1,1' - disubstituted - 1,1'-dihydro-4,4'-bipyridyls can also be prepared by treating a 1,1'-disubstituted-1,1', 4,4'-tetrahydro-4,4'-bipyridyl with a dehydrogenation catalyst which is a metal or a metal oxide. The dehydrogenation catalyst can be any such catalyst commonly used in dehydrogenation (or hydrogenation) reactions of organic compounds, especially the platinum metals (Pt, Ruth, Ir, Or, Pd, Rb) and their oxides. The catalyst preferably is finely divided and can be supported on a carrier such as silica, alumina, charcoal, and silica/alumina. Conditions can be as above for S or —S=S—. An example of this preparation is given in Example 12 hereinafter.

The 1,1'-disubstituted-1,1'-dihydro-4,4'- (or -2,2'-) bipyridyls used in the process of the invention are sensitive to air-oxidation to 1,1'-disubstituted-4,4'- (or -2,2'-) bipyridylium salts and so they normally are prepared and stored under an inert atmosphere, for example a nitrogen atmosphere. Moreover, they are not usually isolated from the reaction mixture in which they have been prepared. Since, as described hereinbefore, the 1,1'-disubstituted-1,1'-dihydrobipyridyls are usually prepared in a solvent, their conversion to 1,1'-disubstituted bipyridylium salts usually but not necessarily will be in the presence of the solvent in which they were prepared or a mixture containing that solvent. Oxidation of the 1,1'-disubstituted-1,1'-dihydrobipyridyl with an oxidizing agent other than oxygen or air also usually will be carried out under an inert atmosphere although this is not essential and no steps need be taken to exclude air from the vessel in which the oxidation is carried out. In the examples hereinafter oxidation with agents other than an oxygen containing gas were carried out under nitrogen so that the efficiency of the agent itself could be determined.

Any oxidizing agent can be used which has a redox potential in water more positive than —0.50 v. as compared with the saturated calomel electrode and which is an electron acceptor or is an oxygen-containing gas. The oxidizing agent can be selected from a wide range of both inorganic and organic compounds which are electron acceptors and which have the defined redox potential or is an oxygen-containing gas. The critical feature of the wide variety of oxidizing agents is that they have the defined properties and any compound having these proporties may be employed. The efficiency of the oxidizing agent is to some extent determined by particular redox potential and ease of electron acceptance of the agent, but different types of agents of the same redox potential and ease of electron acceptance will produce substantially the same reaction efficiency. Accordingly a wide variety of oxidizing agents may be used and the oxidizing agent can be selected, for example, from metal salts, inorganic oxyacid anhydrides, quinones, and oxygen-containing gases. Specific examples of oxidizing agents which may be used are metal halides, ceric disulphate (preferably, but not necessarily, in an acidic medium), sulphur dioxide, sulphur trioxide, air, oxygen gas, benzoquinone, chloranil and anthraquinone. Air and oxygen preferably but not necessarily are used in conjunction with water, carbon dioxide and/or acetic acid. Mixtures of oxidizing agents, for example air and carbon dioxide, may be employed.

The 1,1'-disubstituted bipyridylium salts can be recovered from the reaction mixture by conventional processes, for example by extraction of the mixture with water or with a dilute solution of an acid such as sulphuric, hydrochloric, phosphoric or acetic acid. The aqueous phase may then be separated from the organic phase and the bipyridylium salt may be recovered from the aqueous phase by evaporation of the water and crystallization of the salt.

The product of oxidizing the 1,1'-disubstituted-1,1'-dihydrobipyridyl by the process of the invention is a 1,1'-disubstituted bipyridylium salt wherein the anion is derived from the oxidizing agent which accepts electrons from the dihydrobipyridyl during the oxidation reaction. However, the anion obtained in this way may if desired be replaced by a common anion, for example the chloride ion, by acidifying the reaction mixture containing the 1,1'-disubstituted bipyridylium salt. Thus in some of the examples the final reaction mixture was acidified but it is to be understood that the purpose of doing so is as explained above. Moreover in the case where oxygen or air and/or carbon dioxide are employed as oxidizing agent it is convenient, though not essential, to acidify the reaction mixture prior to the oxidation and this again is done in some of the following examples.

The invention is illustrated but in no way limited by the following examples, several of which also demonstrate the preparation of 1,1'-disubstituted-1,1'-dihydrobipyridyls.

EXAMPLE 1

A solution of ceric sulphate (7 gms.) in 1 N sulphuric acid (125 mls.) was added with stirring at 25° C. to a solution of 1,1'-dimethyl-1,1'-dihydro-4,4'-bipyridyl (0.02 mole) in toluene (50 mls.) under an atmosphere of nitrogen.

The aqueous phase was separated from the resulting mixture and was found by spectrophotometric analysis to contain the 1,1'-dimethyl-4,4'-bipyridylium cation in an amount representing a reaction efficiency of about 100% with respect to the dihydrobipyridyl fed.

EXAMPLE 2

A solution of 1,1'-dimethyl-1,1'-dihydro-4,4'-bipyridyl (0.02 mole) in toluene (50 mls.) was added under an atmosphere of nitrogen to a stirred solution of sulphur dioxide gas (0.04 mole) in acetonitrile (50 mls.) at room temperature. A precipitate was obtained and this was dissolved in water to yield a solution which was found by spectrophotometric analysis to contain the 1,1'-dimethyl-4,4'-bipyridylium cation. The reaction efficiency in respect of this cation was about 100% based on the dihydrobipyridyl fed. The experiment was repeated at 0° C. instead of room temperature. The mixture was stirred for 24 hours. The reaction efficiency was about 100%.

EXAMPLE 3

Dilute (5%) aqueous acetic acid solution (50 mls.) was added to a solution of 1,1'-dimethyl-1,1'-dihydro-4,4'-bipyridyl (0.02 mole) in toluene at 25° C. with stirring under an atmosphere of nitrogen. Air was then blown through the mixture at a rate of 50 litres/hour for 10 minutes. The resulting solution was found by spectrophotometric analysis to contain the 1,1'-dimethyl-4,4'-bipyridylium cation in an amount representing a reaction efficiency of 100% based on the dihydrobipyridyl fed.

EXAMPLE 4

A small amount of water (ca. 10 mls.) was added to a solution of 1,1'-dimethyl-1,1'-dihydro-4,4'-bipyridyl (0.02 mole) in toluene (50 mls.) under an atmosphere of nitrogen, and a mixture of air and carbon dioxide (v./v. ratio 1) was blown through the solution at a rate of 50 ml./hour for 10 minutes. The product was the 1,1'-dimethyl-4,4'-bipyridylium cation and the reaction efficiency was 100% based on the dihydrobipyridyl fed.

EXAMPLE 5

A solution of 2 parts by weight of benzoquinone in diglyme (50 mls.) was added to a solution of 1 part by weight of 1,1'-dimethyl-1,1'-dihydro - 4,4' - bipyridyl in toluene (50 mls.) under an atmosphere of nitrogen. Aqueous sulphuric acid (2 N) was added to the mixture until the mixture just became acidic and the resulting aqueous layer was separated from the organic solvent layer. Spectrophotometric analysis of the aqueous phase showed the presence of 1,1'-dimethyl-4,4'-bipyridylium cation in an amount representing a reaction efficiency of 70% based on dihydrobipyridyl fed.

EXAMPLE 6

A solution of 2 parts by weight of chloranil in dimethyl formamide (50 mls.) was added to a solution of 1 part by weight of 1,1'-dimethyl-1,1'-dihydro-4,4'-bipyridyl in toluene (50 mls.) under an atmosphere of nitrogen. The resulting precipitate was filtered off and treated with aqueous sulphuric acid (2 N—) until the mixture just became acidic. A precipitate comprising the reduced choranil was removed by filtration and the resulting solution was analyzed. The reaction efficiency was 85% in respect of 1,1'-dimethyl-4,4'-bipyridylium cation produced, based on dihydrobipyridyl fed.

EXAMPLE 7

1,1'-dimethyl-1,1',4,4'-tetrahydro - 4,4' - bipyridyl was prepared by reacting 60 mls. of a solution of methyl pyridinium chloride in water (2.754 moles/l.) with 100 mls. of sodium amalgam (0.4% w./w.) under an atmosphere of nitrogen. The product was dissolved in 200 mls. of petrol (B.P. 60–80° C.).

2 mls. of this solution of the tetrahydrobipyridyl were added dropwise over a period of 15 minutes to 50 mls. of carbon disulphide containing 3.0 gms. of flowers of sulphur maintained under an atmosphere of nitrogen. The mixture was stirred for 2 days at ambient temperature and then the temperature was raised to 46° C. for 3 hours.

The mixture, which contained 1,1'-dimethyl - 1,1'-dihydro-4,4'-bipyridyl was cooled and poured into dilute hydrochloric acid (150 mls.) under nitrogen. Air was blown through the mixture which was then filtered to remove sulphur. Colorimetric analysis of the solution indicated 104 mgms. of 1,1'-dimethyl-4,4'-bipyridylium dichloride, representing an efficiency of 49% based on the methyl pyridinium chloride starting material. The experiment was repeated but the mixture was not cooled prior to oxidation. The reaction efficiency was 50%.

EXAMPLE 8

A solution of sulphur (0.66 gm.) in thiophene (25 mls.) was added dropwise over a period of 15 minutes to 5 mls. of a solution in petrol of 1,1'-dimethyl-1,1',4,4'-tetrahydro-4,4'-bipyridyl prepared as in Example 7 and under an atmosphere of nitrogen. The mixture was stirred for 18 hours at ambient temperature. The product was 1,1'-dimethyl-1,1'-dihydro-4,4'-bipyridyl.

The mixture was poured into dilute hydrochloric acid (150 mls.) under nitrogen. Air was blown through the mixture which was then filtered to remove sulphur. Colorimetric analysis indicated 250 mgms. of 1,1'-dimethyl-4,4'-bipyridylium dichloride, representing an efficiency of 47% based on the methyl pyridinium chloride starting material.

EXAMPLE 9

25 mls. of a saturated solution of sulphur in pyridine were added dropwise over a period of 15 minutes to a mixture of 10 mls. of pyridine and 10 mls. of a solution of 1,1'-dimethyl-1,1',4,4'-tetrahydro-4,4'-bipyridyl in toluene (prepared as in Example 7 but using toluene instead of petrol to dissolve the product) under an atmosphere of nitrogen. The mixture was stirred at ambient temperature for 2 hours to form 1,1'-dimethyl-1,1'-dihydro-4,4'-bipyridyl, and then poured into dilute hydrochloric acid (150 mls.) under nitrogen. Air was blown through the mixture which was then filtered to remove sulphur. Colorimetric analysis of the final solution indicated a yield of 414 mgms. of 1,1'-dimethyl-4,4'-bipyridylium dichloride, representing an efficiency of 39% based on the methyl pyridinium chloride starting material.

EXAMPLE 10

Ethylene-bis-pyridinium bromide (2.1271 gms. in 10 mls. water) was added dropwise over a period of about 30 minutes to a stirred mixture of sodium amalgam (10 mls. containing 0.45% sodium) and cyclohexane (60 mls.) under an atmosphere of nitrogen. The resulting solution of 1,1'-ethylene-1,1',2,2'-tetrahydro-2,2'-bipyridyl was filtered and to it was added carbon disulphide (20 mls.) containing sulphur (2.5 gms.).

The mixture was stirred at 46° C. for 18 hours after which time the product was 1,1'-ethylene-1,1'-dihydro-2,2'-bipyridyl. The mixture was cooled to ambient temperature and poured into dilute acetic acid (150 mls.) under nitrogen. Air was blown through the mixture after which it was filtered to remove sulphur. Spectroscopic (ultraviolet) analysis of the final solution indicated a yield of 206 mgms. of 1,1'-ethylene-2,2'-bipyridylium ion, representing an efficiency of 18% based on the ethylene-bis-pyridinium bromide starting material.

EXAMPLE 11

A solution of 1,1'-ethylene-1,1',2,2'-tetrahydro-2,2'-bipyridyl in toluene was prepared by the procedure of Example 10 but using toluene instead of cyclohexane as solvent. A portion (10 mls.) of this solution was added to 20 mls. of a saturated solution of sulphur in xylene, and stirred at 20° C. under an atmosphere of nitrogen for 18 hours to produce 1,1'-ethylene-1,1'-dihydro-2,2'-bipyridyl. The solution was then poured into dilute hydrochloric acid (50 mls.) and air was blown through the mixture. The mixture was filtered to remove sulphur. Spectroscopic (ultraviolet) analysis of the final aqueous solution indicated a yield of 40 mgms. of 1,1'-ethylene-2,2'-bipyridylium dichloride, representing an efficiency of 23% based on the ethylene bis-pyridinium bromide starting material.

EXAMPLE 12

A solution of 1,1'-dimethyl-1,1',4,4'-tetrahydro-4,4'-bipyridyl (0.03 m.) in benzene (50 mls.) was added with stirring to a suspension of 0.3 gm. of a dehydrogenation catalyst (5% w./w. finely divided platinum supported on charcoal) in benzene (50 mls.) under an atmosphere of nitrogen gas. The mixture was heated at 70–75° C. for 4 hours to produce 1,1'-dimethyl-1,1'-dihydro-4,4'-bipyridyl. Air was then blown through the hot mixture after which N/10 hydrochloric acid was added. The mixture was filtered and the aqueous layer was separated and analyzed colorimetrically. Analysis indicated that the solution contained 1,1'-dimethyl-4,4'-bipyridylium chloride.

EXAMPLE 13

A solution of 1,1'-di(N,N-dimethylcaramidomethyl)-1,1'-dihydro-4,4'-bipyridyl (0.02 m.) in toluene (50 mls.) is added under nitrogen to a stirred solution of sulphur dioxide gas (0.04 m.) in acetonitrile (50 mls.). The resulting precipitate was dissolved in water to yield a solution containing the 1,1'-di(N,N-dimethylcarbamidomethyl)-4,4'-bipyridylium ion in an amount representing a reaction efficiency of about 100% based on the dihydrobipyridyl fed.

What is claimed is:

1. A process for the manufacture of a 1,1'-disubstituted-4,4'- (or -2,2'-) bipyridylium salt wherein the 1,1'-substituents are lower alkyl, benzyl or carbamido lower alkyl groups or when taken together in a 1,1'-disubstituted-2,2'-bipyridylium salt are a lower alkylene group, which comprises treating the corresponding 1,1'-disubstituted-1,1'-dihydro-4,4'- (or -2,2'-) bipyridyl at a temperature of from 0° C. to 150° C. with an oxidizing agent which is an electron acceptor and which has a redox potential in water more positive than —0.50 volt as compared with the saturated calomel electrode or which is an oxygen-containing gas.

2. A processs as claimed in claim 1 wherein the treatment is carried out in the presence of a water-immiscible solvent for the dihydrobipyridyl which is inert to the dihydrobipyridyl and the oxidizing agent.

3. A process as claimed in claim 2 wherein an organic water-immiscible solvent is employed.

4. A process as claimed in claim 1 wherein the temperature is from 20° C. to 100° C.

5. A process as claimed in claim 4 wherein the treatment is carried out at room temperature.

6. A process as claimed in claim 2 wherein the concentration of the dihydrobipyridyl is from 0.05 to 0.15 mole per litre.

7. A process as claimed in claim 6 wherein the oxidizing agent is employed in a concentration of from 0.1 to 10 grams per 100 mls. of the reaction mixture.

8. A process as claimed in claim 1 wherein the dihydrobipyridyl is a 1,1′-disubstituted-1,1′-dihydro-4,4′-bipyridyl.

9. A process as claimed in claim 1 wherein the dihydrobipyridyl is a 1,1′-disubstituted-1,1′-dihydro-2,2′-bipyridyl.

10. A process as claimed in claim 8 wherein the 1,1′-substituents are lower alkyl groups.

11. A process as claimed in claim 9 wherein the 1,1′-substituents when taken together represent a lower alkylene group.

12. A process as claimed in claim 1 wherein the carbamido-lower alkyl groups are carbamidomethyl groups.

13. A process as claimed in claim 10 wherein the alkyl group is the methyl group.

References Cited
UNITED STATES PATENTS
3,405,135   10/1968   Colchester et al. _ 260—295AM ALAN L. ROTMAN, Primary Examiner U.S. Cl. X.R.
71—94, 92; 260—295 AM, 295 T, 296 D, 296 H

UNITED STATES PATENT OFFICE
CERTIFICATE OF CORRECTION

Patent No. 3,803,147                             Dated April 9, 1974

Inventor(s) John Francis Cairns

It is certified that error appears in the above-identified patent and that said Letters Patent are hereby corrected as shown below:

On the cover sheet insert -- The portion of the term of this patent subsequent to Dec. 19, 1989, has been disclaimed. --.

Signed and sealed this 31st day of December 1974.

(SEAL)
Attest:

McCOY M. GIBSON JR.                    C. MARSHALL DANN
Attesting Officer                      Commissioner of Patents